US007221391B2

(12) United States Patent
Yamagishi

(10) Patent No.: US 7,221,391 B2
(45) Date of Patent: May 22, 2007

(54) IMAGE SENSING APPARATUS, IMAGE PROCESSING APPARATUS AND METHOD, AND IMAGE PROCESSING SYSTEM

(75) Inventor: Yoichi Yamagishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 10/206,035

(22) Filed: Jul. 29, 2002

(65) Prior Publication Data
US 2003/0025805 A1 Feb. 6, 2003

(30) Foreign Application Priority Data
Jul. 31, 2001 (JP) ............................. 2001-232765

(51) Int. Cl.
*H04N 5/228* (2006.01)
(52) U.S. Cl. ................................ 348/222.1; 348/207.1
(58) Field of Classification Search .............. 348/231.3
See application file for complete search history.

(56) References Cited

U.S. PATENT DOCUMENTS

| 5,222,008 | A | | 6/1993 | Yamagishi et al. | ......... | 360/137 |
|---|---|---|---|---|---|---|
| 5,561,650 | A | | 10/1996 | Yamagishi | .................... | 369/48 |
| 5,613,004 | A | * | 3/1997 | Cooperman et al. | .......... | 380/28 |
| 5,854,875 | A | | 12/1998 | Yamagishi | .................. | 386/120 |
| 5,862,218 | A | * | 1/1999 | Steinberg | .................... | 713/176 |
| 6,064,764 | A | * | 5/2000 | Bhaskaran et al. | ......... | 382/183 |
| 6,192,138 | B1 | * | 2/2001 | Yamadaji | .................... | 382/100 |
| 6,532,039 | B2 | * | 3/2003 | Anderson | ................ | 348/231.3 |
| 6,590,996 | B1 | * | 7/2003 | Reed et al. | ................. | 382/100 |
| 6,628,325 | B1 | * | 9/2003 | Steinberg et al. | ........ | 348/211.1 |
| 6,762,791 | B1 | * | 7/2004 | Schuetzle | ................ | 348/231.3 |
| 6,834,130 | B1 | * | 12/2004 | Niikawa et al. | ............ | 382/305 |

* cited by examiner

*Primary Examiner*—Ngoc-Yen Vu
*Assistant Examiner*—Dillon Durnford-Geszvain
(74) *Attorney, Agent, or Firm*—Fitzpatrick, Cella, Harper & Scinto

(57) ABSTRACT

A camera includes an image sensing unit that generates unprocessed image data, an image processing unit that processes the unprocessed image data, an embedding unit that embeds first additional information in the processed image data using a digital watermarking technique, an attaching unit and a recording unit. The attaching unit attaches the first and second additional information to the unprocessed image data. The second additional information indicates to an external device that if the device generates processed image data from the unprocessed image data, it is to embed the first additional information in the processed image data using the digital watermarking technique. The recording unit records the processed image data, in which the first additional information is embedded, to a removable recording medium, in a first image recording mode, and records the unprocessed image data, to which the first and second additional information are attached, to the removable recording medium, in a second image recording mode.

15 Claims, 9 Drawing Sheets

IMAGE SENSING APPARATUS, IMAGE PROCESSING APPARATUS AND METHOD, AND IMAGE PROCESSING SYSTEM

FIELD OF THE INVENTION

The present invention relates to an image sensing apparatus, an image processing apparatus and method, and an image processing system and, more particularly, to image processing of photographing still and moving images and processing the images.

BACKGROUND OF THE INVENTION

Image sensing apparatuses such as an electronic camera which uses a memory card having a solid-state memory element as a recording medium, and records, plays back, and/or communicates still and moving images are commercially available.

Some of the electronic cameras comprise a plurality of photographing recording modes such as a photographing recording mode (to be referred to as a "JPEG mode" hereinafter) for an image signal form (e.g., JPEG format) that is irrespective of the pixel array of image sensing devices such as CCDs or CMOSs and complies with a predetermined compression method or the like, and a photographing recording mode (to be referred to as a "CCD-RAW mode" hereinafter) for an image signal form (e.g., RAW format) corresponding to the pixel array of image sensing devices. The JPEG mode is selected to reduce the data amount of image data to be recorded and put importance on the versatility of the image signal form. The CCD-RAW mode is selected to put importance on the image quality of image data. In this manner, the photographing recording mode can be arbitrarily switched to perform photographing.

Image data photographed in the JPEG mode undergoes predetermined color conversion, color correction, tone correction, and white balance correction by the developing processing section of the electronic camera. After that, the image data is converted into a JPEG image signal form and recorded on a memory card or the like. To the contrary, image data photographed in the CCD-RAW mode is converted into a predetermined RAW image data format without changing an image signal form corresponding to the pixel array of image sensing devices, and is recorded on a memory card or the like.

Image data in the RAW image data format (to be referred to as "RAW data" hereinafter) can undergo predetermined color conversion, color correction, tone correction, and white balance correction by a developing processing program executed by a personal computer or the like or by developing processing performed by developing hardware such as an image reproduction device. The processed RAW data can be displayed and checked on a display device. The developing program and developing hardware can perform image quality settings such as white balance correction, contrast correction, sharpness, and color density adjustment which meet user's tastes, while maintaining the quality of image data without any degradation. The features of digital image data which allows processing an image can be exploited without degrading the image quality.

Compared to analog information, digital information can be easily processed without degrading the quality. In other words digital information is readily processed. To prevent copying, tampering, and illicit use of digital information, there is proposed a technique of embedding digital watermark information in an image.

Digital watermark information is embedded such that even if the digital watermark-embedded digital information is normally reproduced, the digital watermark is not recognized by the human eye. As a typical information embedding method using a digital watermark, a photographed image undergoes frequency conversion such as high-speed Fourier transform, discrete cosine transform, or wavelet transform, information is attached to the frequency domain, and inverse transform is executed to embed the information as digital watermark information. Typical examples of embedded information are copyright information and user information.

Embedding of digital watermark information is considered to be effective for preventing copying, tampering, and illicit use of a digital image photographed by the electronic camera.

Image data photographed in the JPEG mode undergoes predetermined developing processing and JPEG compression processing in the electronic camera. The image data further undergoes digital watermark information embedding processing and is recorded on a memory card. Prevention of copying, tampering, and illicit use of the photographed digital image can be guaranteed at the photographing time point.

When, however, digital watermark information is embedded in image data photographed in the CCD-RAW mode and the image data is recorded on a memory card, the embedded digital watermark information is greatly damaged in developing processing by the developing processing hardware or developing hardware. Prevention of copying, tampering, and illicit use of the digital image photographed in the CCD-RAW mode cannot be guaranteed at the photographing time point.

SUMMARY OF THE INVENTION

The present invention has been made to solve the above-described problems individually or simultaneously, and has as its object to guarantee prevention of copying, tampering, and illicit use of a digital image in consideration of unprocessed image sensing data acquired by an image sensing device.

To achieve the above object, according to a preferred aspect of the present invention, there is disclosed an image processing system comprising: a camera which comprises an image sensing device, an attaching section arranged to attach digital watermark information to image sensing data, and a communication section arranged to communicate with an external device; and an information processing apparatus which comprises a communication section arranged to communicate with an external device, an image processor arranged to perform image processing for image sensing data, and an embedding section arranged to embed a digital watermark, wherein the camera attaches digital watermark information to unprocessed image sensing data acquired by the image sensing device, and the information processing apparatus performs image processing for the image sensing data received from the camera, and embeds the digital watermark information attached to the received image sensing data in processed image sensing data.

There is also disclosed an image processing system comprising: a camera which comprises an image sensing device, a setting section arranged to set embedding of a digital watermark by a user, an attaching section arranged to attach digital watermark information and an embedding designation to image sensing data, and a communication section arranged to communicate with an external device; and an information processing apparatus which comprises a communication section arranged to communicate with an external device, an image processor arranged to perform image processing for image sensing data, and an embedding section arranged to embed a digital watermark, wherein in a case where embedding of a digital watermark is set, the camera attaches digital watermark information and an embedding designation to unprocessed image sensing data acquired by the image sensing device, and the information processing apparatus performs image processing for the image sensing data received from the camera, and when the embedding designation is attached to the received image sensing data, embeds the digital watermark information attached to the received image sensing data in processed image sensing data.

There is also disclosed an image processing system comprising: a camera which comprises an image sensing device, an image processor arranged to perform image processing for image sensing data, a watermark processor arranged to perform processing concerning a digital watermark, and a communication section arranged to communicate with an external device; and an information processing apparatus which comprises a communication section arranged to communicate with an external device, an image processor arranged to perform image processing for image sensing data, and an embedding section arranged to embed a digital watermark, wherein when image processing is performed for image sensing data acquired by the image sensing device, the camera embeds digital watermark information in processed image sensing data, and when no image processing is performed, attaches digital watermark information and an embedding designation to unprocessed image sensing data, and when the unprocessed image sensing data is received from the camera, the information processing apparatus performs image processing for the received image sensing data, and embeds the digital watermark information attached to the received image sensing data in the processed image sensing data.

There is also disclosed an image processing system comprising: a camera which comprises an image sensing device, an image processor arranged to perform image processing for image sensing data, a setting section arranged to set embedding of a digital watermark by a user, a watermark processor arranged to perform processing concerning a digital watermark, and a communication section arranged to communicate with an external device; and an information processing apparatus which comprises a communication section arranged to communicate with an external device, an image processor arranged to perform image processing for image sensing data, and an embedding section arranged to embed a digital watermark, wherein when image processing is performed for image sensing data acquired by the image sensing device in a case where embedding of a digital watermark is set, the camera embeds digital watermark information in processed image sensing data, and when no image processing is performed, attaches digital watermark information and an embedding designation to unprocessed image sensing data, and when the unprocessed image sensing data is received from the camera, the information processing apparatus performs image processing for the received image sensing data, and when the embedding designation is attached to the received image sensing data, embeds the digital watermark information attached to the received image sensing data in the processed image sensing data.

There is also disclosed a camera including an image sensing unit, an image processing unit, an embedding unit, an attaching unit and a recording unit. The image sensing unit is adapted to generate unprocessed image data. The image processing unit is adapted to process the unprocessed image data so as to generate processed image data. The embedding unit is adapted to embed first additional information in the processed image data using a digital watermarking technique. The attaching unit is adapted to attach the first additional information and second additional information to the unprocessed image data, the second additional information indicating to an external device that if the external device generates processed image data from the unprocessed image data, the external device is to embed the first additional information in the processed image data using the digital watermarking technique. The recording unit is adapted to (a) record the processed image data, in which the first additional information is embedded, to a removable recording medium, if the camera is in a first image recording mode, and to (b) record the unprocessed image data, to which the first and second additional information are attached, to the removable recording medium, if the camera is in a second image recording mode.

There is further disclosed a method of controlling a camera including generating unprocessed image data using an image sensing unit and processing the unprocessed image data so as to generate processed image data. The method further includes embedding first additional information in the processed image data using a digital watermarking technique and attaching the first additional information and second additional information to the unprocessed image data, the second additional information indicating to an external device that if the external device generates processed image data from the unprocessed image data, the external device is to embed the first additional information in the processed image data using the digital watermarking technique. The method also includes recording the processed image data, in which the first additional information is embedded, to a removable recording medium, if the camera is in a first image recording mode, and recording the unprocessed image data, to which the first and second additional information are attached, to the removable recording medium, if the camera is in a second image recording mode.

There is still further disclosed a computer readable medium storing a computer program for providing a method of controlling a camera. The method includes generating unprocessed image data using an image sensing unit, processing the unprocessed image data so as to generate processed image data, and embedding first additional information in the processed image data using a digital watermarking technique. The method further includes attaching the first additional information and second additional information to the unprocessed image data, the second additional information indicating to an external device that if the external device generates processed image data from the unprocessed image data, the external device is to embed the first additional information in the processed image data using the digital watermarking technique. The method also includes recording the processed image data, in which the first additional information is embedded, to a removable recording medium, if the camera is in a first image recording mode, and recording the unprocessed image data, to which the first and second additional information are attached, to the removable recording medium, if the camera is in a second image recording mode.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An image processing apparatus according to a preferred embodiment of the present invention will be described in detail below with reference to the accompanying drawings. In the following description, the present invention is applied to a case in which a still image is photographed and subjected to image processing. The present invention can also be applied to a case in which a moving image is photographed and subjected to image processing.

Figure 1:
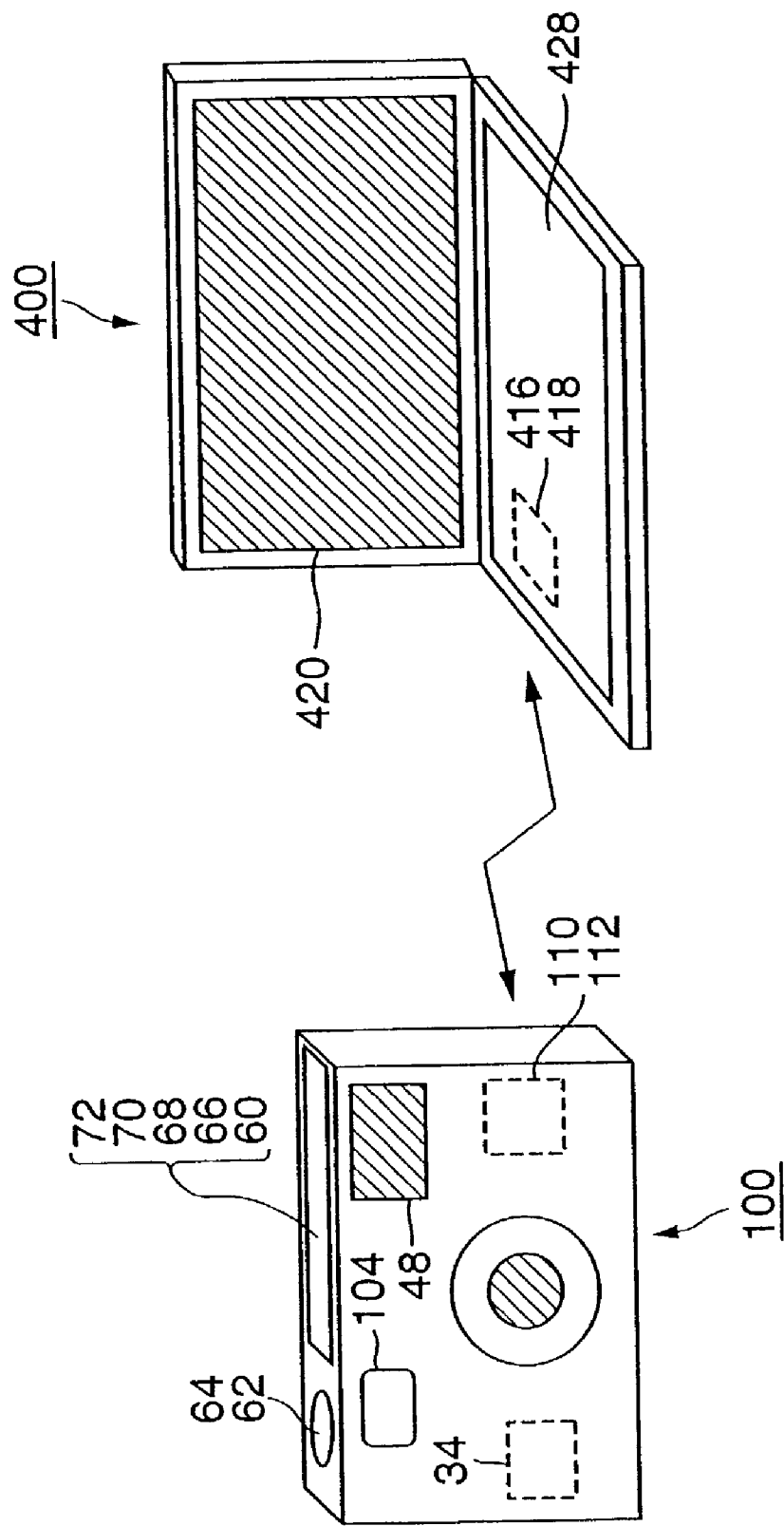
FIG. 1 is a view showing a system configuration according to an embodiment.

FIG. 1 is a view showing a system configuration according to this embodiment.

In FIG. 1, an electronic camera (image sensing apparatus) 100, and a computer (information processing apparatus) 400 used by the user to exchange data including predetermined commands, statuses, and/or images by wire or wireless communication.

[Arrangement of Electronic Camera]

Figure 2:
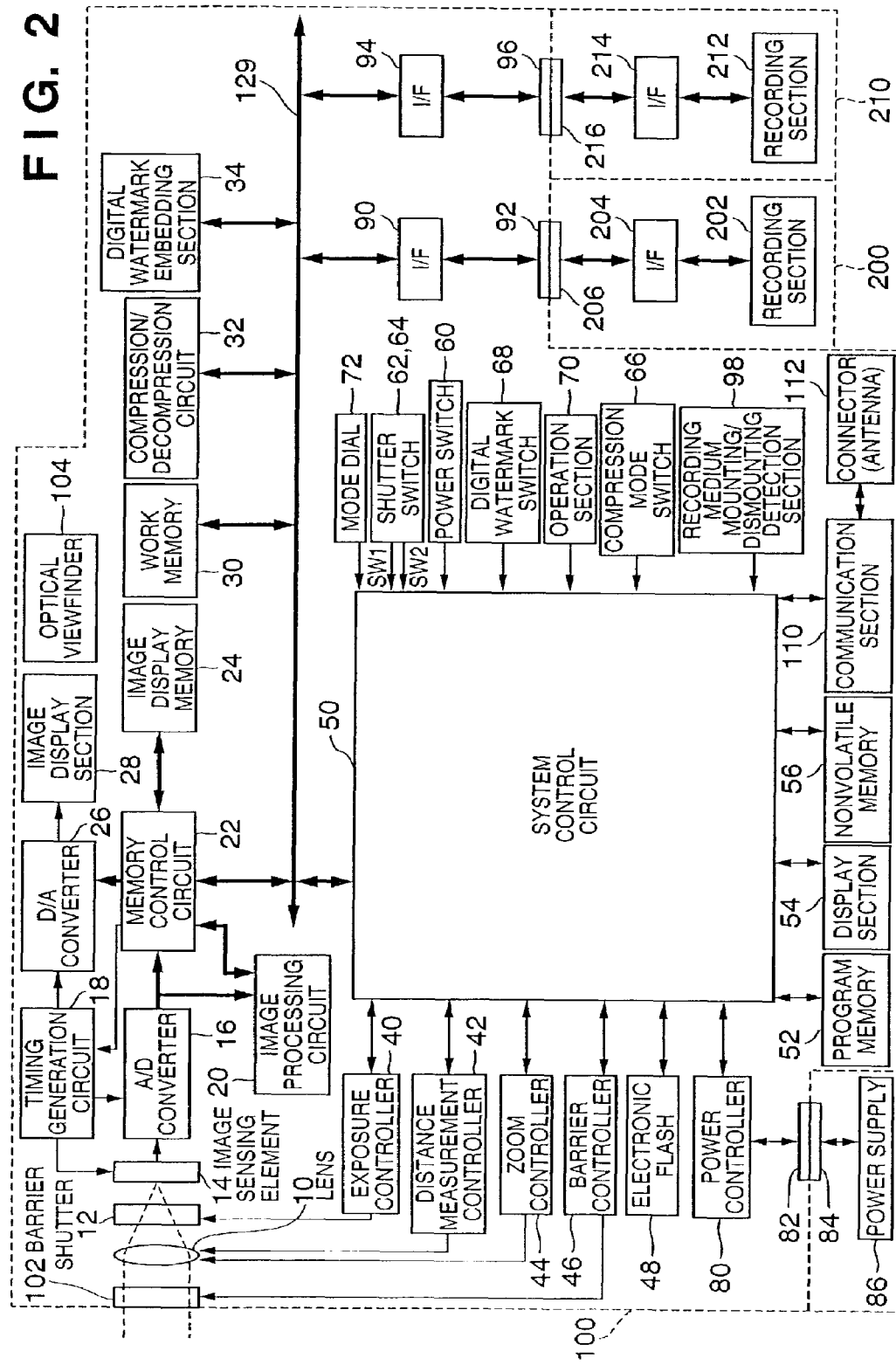
FIG. 2 is a block diagram showing the arrangement of an electronic camera.

FIG. 2 is a block diagram showing the arrangement of the electronic camera 100. FIG. 1 shows the schematic layout of a corresponding arrangement.

In FIG. 2, reference numeral 10 denotes a photographing lens; 12, a shutter with an aperture function; 14, an image sensing element which converts an optical image into an electrical signal; and 16, an analog-to-digital (A/D) converter which converts an analog signal output from the image sensing element 14 into a digital signal.

A timing generation circuit 18 supplies clock signals and control signals to the image sensing element 14, the A/D converter 16, and a D/A converter 26, and is controlled by a memory control circuit 22 and system control circuit 50.

An image processing circuit 20 performs predetermined pixel interpolation processing and color conversion processing for data output from the A/D converter 16 or data sent from the memory control circuit 22. The image processing circuit 20 performs predetermined arithmetic processing for image data to be sensed (to be referred to as "image sensing data" hereinafter). The obtained arithmetic result is utilized for the system control circuit 50 to control an exposure controller 40 and distance measurement controller 42 and execute Through The Lens (TTL) autofocus (AF) processing, automatic exposure (AE) processing, and electronic flash pre-emission (EF) processing. The image processing circuit 20 performs predetermined arithmetic processing for image sensing data, and also performs TTL automatic white balance (AWB) based on the obtained arithmetic result.

The memory control circuit 22 controls the A/D converter 16, the timing generation circuit 18, the image processing circuit 20, an image display memory 24, the D/A converter 26, a work memory 30, and a compression/decompression circuit 32. Data output from the A/D converter 16 is written in the image display memory 24 or work memory 30 via the image processing circuit 20 or directly via the memory control circuit 22.

Display image data written in the image display memory 24 is sent to an image display section 28 formed from a TFT LCD and the like via the D/A converter 26, thereby displaying an image. Sequentially sending image sensing data to the image display section 28 can realize an electronic viewfinder function. The display of the image display section 28 can be arbitrarily turned on/off by an instruction from the system control circuit 50. When the display and backlight are turned off, the power consumption of the electronic camera 100 can be greatly reduced.

The work memory 30 which is formed from a semiconductor RAM and the like and stores photographed still and moving images has a storage capacity enough to store a predetermined number of still images or a moving image of a predetermined period. Even in panoramic photography or sequential shooting photography of successively photographing a plurality of still images, high-speed photography can be achieved by writing a large amount of image data in the work memory 30 at high speed. The work memory 30 can also be used as the work area of the system control circuit 50.

The compression/decompression circuit 32 which compresses/decompresses image data by an image compression method using adaptive discrete cosine transform (ADCT) or the like loads image data stored in the work memory 30, compresses/decompresses the image data, and writes the compressed/decompressed image data in the work memory 30 again.

A digital watermark embedding section 34 performs frequency conversion such as high-speed Fourier transform, discrete cosine transform, or wavelet transform for a photographed image. The digital watermark embedding section 34 attaches digital watermark information to the frequency domain, and executes inverse transform to embed digital watermark information in the image. Examples of data embedded as digital watermark information are information (e.g., manufacturing number) unique to the electronic camera 100, the name of the owner of the electronic camera 100, the photographing date and time, the photographing place, and various photographing conditions. Embedding the pieces of digital watermark information in an image can guarantee prevention of copying, tampering, and illicit use of the photographed image, details of which will be described later.

The exposure controller 40 which controls the shutter 12 having an aperture function also has an electronic flash dimming function in association with an electronic flash 48. The electronic flash 48 has an auxiliary AF light projecting function and electronic flash dimming function. The distance measurement controller 42 controls focusing of the photographing lens 10. A zoom controller 44 controls zooming of the photographing lens 10. A barrier controller 46 controls the operation of a barrier 102 which protects the lens 10.

As described above, the exposure controller 40 and distance measurement controller 42 are controlled by the TTL method. That is, the system control circuit 50 controls the exposure controller 40 and distance measurement controller 42 on the basis of the arithmetic results of calculating image sensing data by the image processing circuit 20.

The system control circuit 50 controls the overall electronic camera 100. A program memory 52 stores a constant, variable, and program for the operation of the system control circuit 50.

A display section 54 displays the operation state and setting state of the electronic camera 100 and various messages by using characters, signs, images (icons), and the like in accordance with the execution of a program by the system control circuit 50. The display section 54 is arranged as a single unit or a plurality of units at easy-to-see positions near the operation section of the electronic camera 100. In general, the display section 54 is made up of an LCD and indicators such as LEDs and lamps. The display section 54 can also output a warning sound, sound message, and the like in combination with a sound generating element. Some of the functions of the display section 54 are arranged to overlap each other within an optical viewfinder 104.

Information displayed on the LCD of the display section 54 includes the setting of single shot/sequential shooting photographing, the setting of a self-timer, the image compression ratio, the number of recording pixels, the number of recording images, the remaining number of photographable images, the shutter speed, the aperture value, the setting of exposure correction, the setting of an electronic flash, the setting of pink-eye reduction, the setting of macro photography, the setting of a beeper, the residual capacity of a timepiece battery, the residual capacity of a battery, the error status, information represented by a number of a plurality of digits, the insertion/removal states of recording media 200 and 210, the operation of a communication interface (I/F), the date and time, and the connection state to an external computer.

Of display information on the display section 54, information displayed on the optical viewfinder 104 includes an in-focus state, completion of photographing preparation, a camera shake warning, an electronic flash charging state, completion of charging the electronic flash, the shutter speed, the aperture value, an exposure compensation state, and write operation of a recording medium.

Information displayed on an indicator such as the LED the display section 54 includes an in-focus state, completion of photographing preparation, a camera shake warning, an electronic flash charging state, completion of charging the electronic flash, write operation of a recording medium, a macro photography setting notification, and the charging state of a secondary battery.

Information displayed on an indicator such as the lamp of the display section 54 is, e.g., a self-timer notification. The self-timer notification lamp can also be used as an auxiliary AF light source.

An electrically erasable/programmable nonvolatile memory 56 is an EEPROM or the like.

Reference numerals 60, 62, 64, 66, 68, 70, and 72 denote input devices for inputting various instructions to the system control circuit 50. The input devices are constituted by input devices such as a switch, a dial, a touch panel, a pointing device by line-of-sight detection, and a voice recognition device singly or by combinations of them.

The power switch 60 switches the power-on/off state of the electronic camera 100. The power switch 60 also switches the power-on/off states of various attachments such as a lens unit and external electronic flash (not shown) connected to the electronic camera 100, and the recording media 200 and 210.

The shutter switch 62 (SW1) is turned on by half-pressing the shutter button. After the shutter switch 62 is ON, AF processing, AE processing, AWB processing, and EF processing start.

The shutter switch 64 (SW2) is turned on by fully pressing the shutter button. After the shutter switch 64 is ON, a series of processes start. These processes include exposure processing of writing via the memory control circuit 22 in the work memory 30 image data which is read by the image sensing element 14 and A/D-converted by the A/D converter 16, developing processing of performing arithmetic processing by the image processing circuit 20 for image data which is read out from the work memory 30 by the memory control circuit 22, and recording processing of compressing by the compression/decompression circuit 32 image data read out from the work memory 30 and writing the compressed data in the recording medium 200 or 210.

The compression mode switch 66 is a switch for selecting the compression ratio of JPEG compression in the JPEG mode, and selecting the CCD-RAW mode in which a signal output from the image sensing element 14 is directly digitized and recorded on a recording medium without any compression. For the compression ratio of JPEG compression, a high-compression-ratio normal mode and a low-compression-ratio fine mode are prepared. The compression mode switch 66 allows the user to select any one of the JPEG normal mode, JPEG fine mode, and CCD-RAW mode.

In the JPEG mode, a signal output from the image sensing element 14 is converted into image data by the A/D converter 16. The image data is written in the work memory 30 via the image processing circuit 20 and memory control circuit 22. Image data (to be referred to as "JPEG data" hereinafter) which is read out from the work memory 30 and subjected to JPEG compression at a compression ratio set by the compression/decompression circuit 32 is recorded on the recording medium 200 or 210.

In the CCD-RAW mode, signals are read out from each line in accordance with the pixel array of the color filter of the image sensing element 14, and converted into digital data (to be referred to as "RAW data" hereinafter) by the A/D converter 16. The RAW data is written in the work memory 30 via the memory control circuit 22. RAW data read out from the work memory 30 is recorded on the recording medium 200 or 210. In the CCD-RAW mode, image data may undergo lossless compression without degrading the image quality and be recorded on the recording medium 200 or 210.

The digital watermark switch 68 is a switch for setting whether to embed digital watermark information in a photographed image.

The operation section 70 made up of a button, touch panel, and the like has a menu button, a set button, a macro button, a multiwindow playback/page break button, an electronic flash setting button, a single shooting/sequential shooting/self-timer switching button, a menu moving "+(plus)" button, a menu moving "−(minus)" button, a playback image moving "+(plus)" button, a playback image moving "−(minus)" button, a photographing image quality selection button, an exposure correction button, a date/time setting button, an image display ON/OFF button used to set the ON/OFF state of the image display section 28, and a quick review ON/OFF button used to set a quick review function of automatically playing back a photographed image on the image display section 28 immediately after photographing.

The mode dial 72 is a dial for switching the function mode of the electronic camera 100. The mode dial 72 can switch the function mode between "photographing mode", "playback/erase mode", and "communication mode". The photographing mode includes an automatic photographing mode, a program photographing mode, a shutter speed priority photographing mode, an aperture priority photographing mode, a manual exposure photographing mode, a focal depth of field priority (depth) photographing mode, a portrait photographing mode, a landscape photographing mode, a close-up photographing mode, a sports photographing mode, a night scene photographing mode, and a panoramic photographing mode. The playback/erase mode includes a playback mode and a multiwindow playback/erase mode. The communication mode includes a PC connection mode.

A power controller 80 is constituted by a battery detection circuit, a DC-DC converter, and a switching circuit which switches a block to be energized. The power controller 80 detects the mounting/dismounting of a battery, the type of battery, and the residual capacity of the battery. The power controller 80 controls the DC-DC converter on the basis of a detection result and an instruction from the system control circuit 50, and supplies necessary power to the respective sections including the recording medium for a necessary period. A power supply 86 is formed from a primary battery such as an alkaline cell or lithium cell, a secondary battery such as an NiCd battery, NiMH battery, or Li-ion battery, or a power adaptor. The power supply 86 is detachably connected to the power controller 80 via connectors 82 and 84.

Interfaces (I/Fs) 90 and 94 connect a system bus 129 of the electronic camera 100, and a recording medium such as a memory card or hard disk detachably connected via connectors 92 and 96. A recording medium mounting/dismounting detection section 98 detects whether a recording medium is mounted in the connector 92 and/or 96. The recording medium mounting/dismounting detection section 98 can also detect mounting of, e.g., a communication card (to be described later) instead of the recording medium.

This embodiment adopts two interfaces and two connectors for connecting a recording medium. However, the number of interfaces or connector may be one or three or more. As the interface and connector, those which comply with the standard of a Personal Computer Memory Card International Association (PCMCIA) card or compact Flash (CF) card can be used. Said two interfaces and two connectors may comply with different standards.

If the interfaces and connectors comply with the standard of the PCMCIA card or CF card, they enable connecting various communication cards such as a LAN card, MODEM card, USB (Universal Serial Bus) card, IEEE 1394 card, IEEE 1284 card, SCSI (Small Computer System Interface) card, and PHS (Personal Handy-phone System) communication card. The interfaces and connectors can communicate image data and management information accessory to the image data with another peripheral device such as a computer or printer.

The recording media 200 and 210 are recording media such as a memory card or hard disk. Each of these recording media comprises a recording section 202 (or 212) formed from a semiconductor memory, magnetic disk, or the like, and an interface 204 (or 214) and connector 206 (or 216) for connecting the recording medium to the electronic camera 100.

The barrier 102 mechanically covers an image sensing section including the lens 10, thereby protecting the image sensing section and preventing any dust deposition or damage.

The optical viewfinder 104 allows the user to optically observe the photographing range without using any electronic viewfinder function of the image display section 28. As described above, some of the functions of the display section 54 are arranged within the optical viewfinder 104.

A communication section 110 has various communication functions including a serial communication function such as RS232C, USB, and/or IEEE 1394, a parallel communication function such as IEEE 1284 and/or SCSI, a wireless communication function such as MODEM, LAN, or Bluetooth, and an infrared communication function such as IrDA. The communication section 110 has a connector 112 for connecting a cable which connects the electronic camera 100 to another device. The antenna corresponds to the connector 112 for wireless communication, whereas the light transmission/reception section corresponds to the connector 112 for infrared communication.

[Arrangement of Computer]

Figure 3:
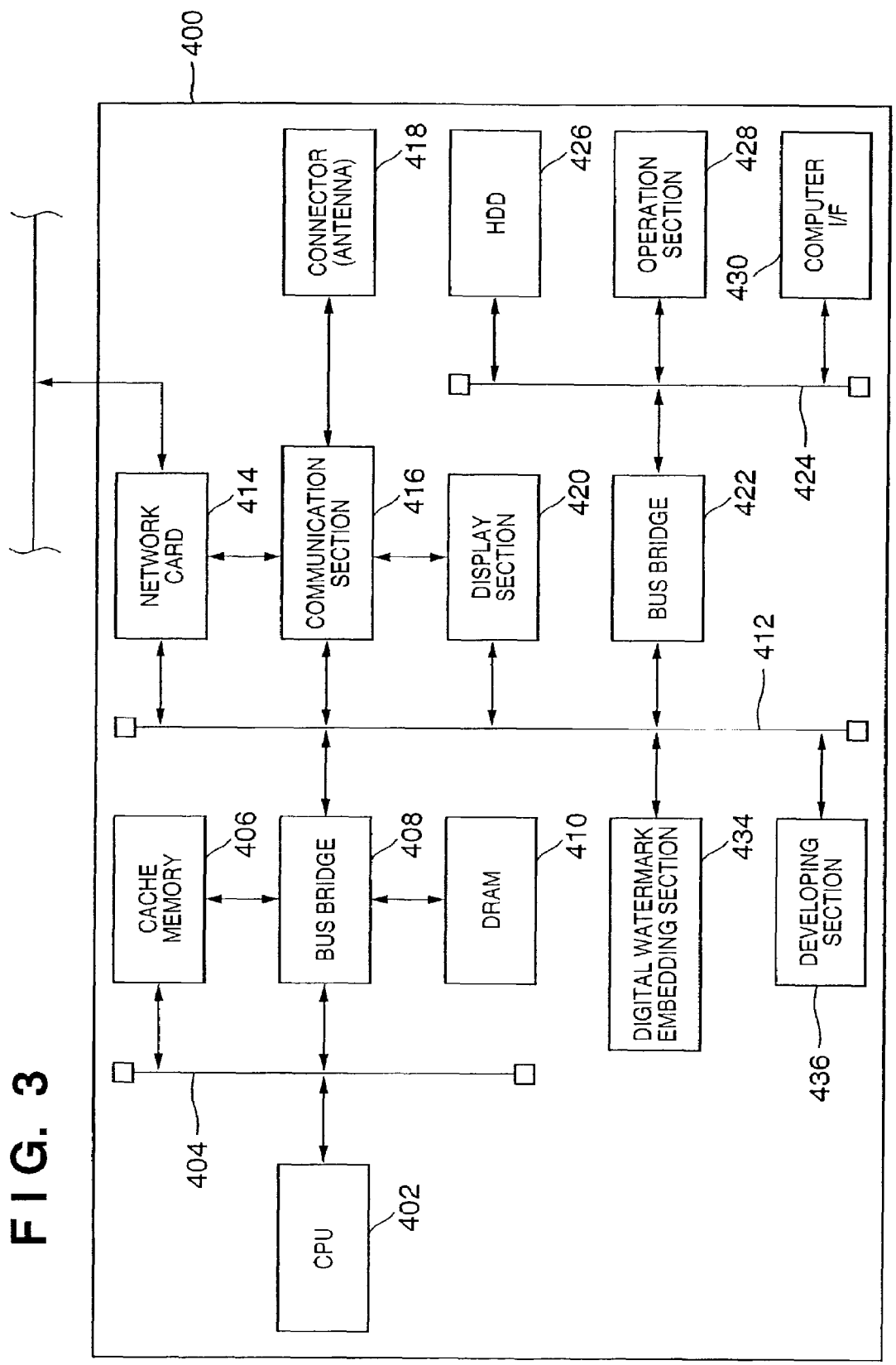
FIG. 3 is a block diagram showing the arrangement of a computer.

FIG. 3 is a block diagram showing the arrangement of the computer 400. FIG. 1 shows the schematic layout of a corresponding arrangement.

A CPU 402 controls the whole computer 400 via a CPU bus 404, and executes various arithmetic operations. The CPU bus 404 to which the CPU 402, a cache memory 406, and a bus bridge 408 are connected transfers data processed by the CPU 402 at high speed.

The cache memory 406 accessible by the CPU 402 at high speed caches (temporarily stores) data and commands necessary to operate the CPU 402. The cache memory 406 is generally a high-speed SRAM (Static RAM) or the like.

The bus bridge 408 connects the CPU bus 404 and a high-speed bus 412 (to be described later), and absorbs the difference in processing (transfer) speed between the buses. Via the bus bridge 408, the CPU 402 which operates at higher speed can exchange data with each unit connected to the high-speed bus 412. The bus bridge 408 comprises a memory controller function. The bus bridge 408 performs a series of memory management operations of reading out, at a predetermined timing, data temporarily written in the cache memory 406 by the CPU 402 and writing the readout data in a DRAM 410, or writing, in the cache memory 406, data read out from the DRAM 410 in accordance with a request from the CPU 402.

The DRAM 410 is a main memory used when the CPU 402 executes various applications. The DRAM 410 is generally an SDRAM (Synchronous DRAM) or the like.

The high-speed bus 412 connects the bus bridge 408, a network card 414, a communication section 416, a display section 420, and a bus bridge 422 to each other. The high-speed bus 412 transfers data processed by the CPU 402 to the units, or transfers (DMA transfer) data between the units at high speed. In general, the bus 412 is a PCI bus or the like.

The network card 414 is an interface for connecting the computer 400 to a network, and exchanges data with the network. The network is generally an Ethernet or the like.

The communication section 416 realizes a wire or wireless communication function by USB, IEEE 1394, SCSI, MODEM, LAN, IrDA, Bluetooth, or the like. A connector 418 is connected to the communication section 416, and connects the computer 400 to another device. The antenna corresponds to the connector 418 for wireless communication, whereas the light transmission/reception section corresponds to the connector 418 for infrared communication.

The display section 420 is made up of an LCD, loudspeaker, and the like. The display section 420 displays necessary characters and images and plays back sound in accordance with execution of a program by the CPU 402.

The bus bridge 422 connects the high-speed bus 412 and a low-speed bus 424 (to be described later), and absorbs the difference in processing (transfer) speed between the buses. Via the bus bridge 422, each unit which is connected to the high-speed bus 412 and operates at high speed can exchange data with a unit which is connected to the low-speed bus 424 and operates at low speed.

The low-speed bus 424 connects the bus bridge 422, a hard disk drive (HDD) 426, an operation section 428, and a computer interface (I/F) 430 to each other. The low-speed bus 424 is lower in transfer speed than the high-speed bus 412, and is connected to a unit whose processability is relatively low. The low-speed bus 424 is generally an ISA (Industry Standard Architecture) bus or the like.

The HDD 426 stores an operating system (OS) and various application programs running on the CPU 402, and is managed by the CPU 402.

The operation section 428 is an operation means made up of a keyboard and a pointing device such as a mouse or track pad. The operation section 428 allows the user to input information necessary for the operation of the computer 400 and/or various operation instructions.

The computer I/F 430 is a low-speed computer interface for connecting the computer 400 and a low-speed peripheral device. In general, the computer I/F 430 is utilized for RS-232C which performs serial communication, IEEE 1284 which performs parallel communication, a low-speed USB mode, or the like.

A digital watermark embedding section 434 connected to the high-speed bus 412 performs frequency conversion such as high-speed Fourier transform, discrete cosine transform, or wavelet transform for image data. The digital watermark embedding section 434 attaches digital watermark information to the frequency domain, and executes inverse transform to embed digital watermark information in the image data. Examples of data embedded as digital watermark information are information (e.g., manufacturing number) unique to the electronic camera 100, the name of the owner of the electronic camera 100, the photographing date and time, the photographing place, and various photographing conditions, which are acquired from the electronic camera 100 and attached to CCD-RAW data.

A developing section 436 connected to the high-speed bus 412 performs developing processing such as predetermined pixel interpolation processing and color conversion processing for CCD-RAW data photographed by the electronic camera 100.

[Operation of Electronic Camera]

The operation of the electronic camera 100 will be explained.

Main Routine

Figure 4:
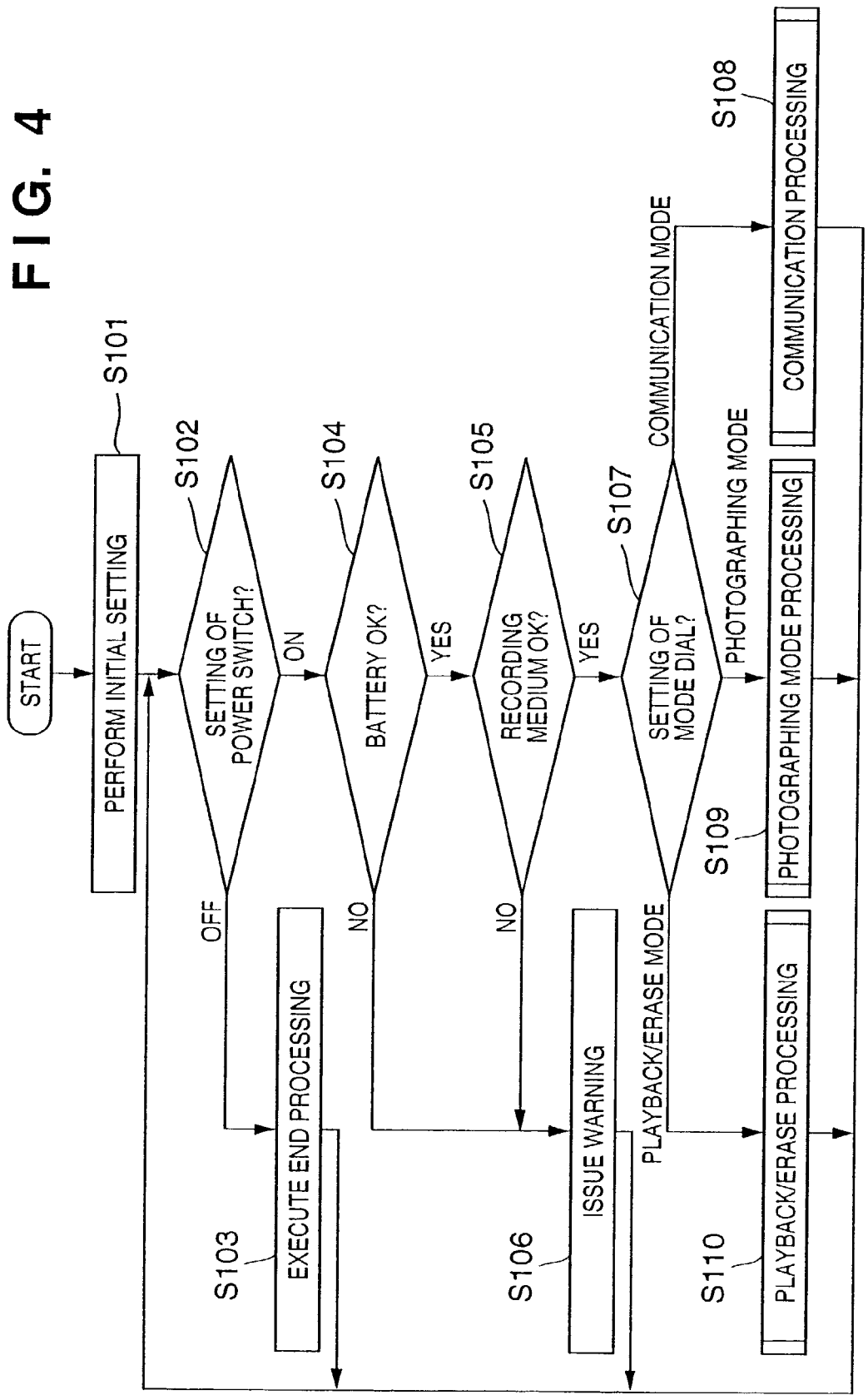
FIG. 4 is a flow chart showing the main routine of processing executed by a system controller 50 of the electronic camera.

FIG. 4 is a flow chart showing the main routine of processing executed by the system controller 50 of the electronic camera 100 according to the embodiment.

When, for example, the battery of the electronic camera 100 is exchanged, the system control circuit 50 initializes flags, control variables, and the like, initializes the respective sections of the electronic camera 100 (S101), and checks the setting of the power switch 60 (S102).

If the power switch 60 is OFF, the system control circuit 50 ends the display of the display section 54 or the like, and closes the barrier 102 to protect the image sensing section. The system control circuit 50 records in the nonvolatile memory 56 the setting mode, and necessary parameters and setting values including flags and control variables. The power controller 80 performs predetermined end processing of interrupting unnecessary power to respective sections including the image display section 28 (S103). After that, the system control circuit 50 returns the processing to step S102, and waits until the power switch 60 is turned on.

If the power switch 60 is ON, the system control circuit 50 checks via the power controller 80 whether the residual capacity and operation status of the power supply 86 formed from a battery or the like are sufficient for the operation of the electronic camera 100 (S104). If the residual capacity or operation status is insufficient, the processing branches to step S106. If the power supply 86 is OK, the system control circuit 50 checks whether the state of the recording medium 200 or 210 is sufficient for the operation of the electronic camera 100, and particularly image data recording/playback operation (S105). If the recording medium is insufficient, the system control circuit 50 branches the processing to step S106.

If NO in step S104 or S105, the system control circuit 50 issues a warning by an image or sound including voice by using the display section 54 or the like (S106). Then, the system control circuit 50 returns the processing to step S102.

If YES in step S104 or S105, the system control circuit 50 checks the setting position of the mode dial 72 (S107), and executes processing corresponding to the setting of the mode dial 72 (S108 to S110). Details of communication processing (S108) corresponding to a communication mode, and details of photographing mode processing (S109) corresponding to a photographing mode will be described later.

Photographing Mode Processing

Figure 5:
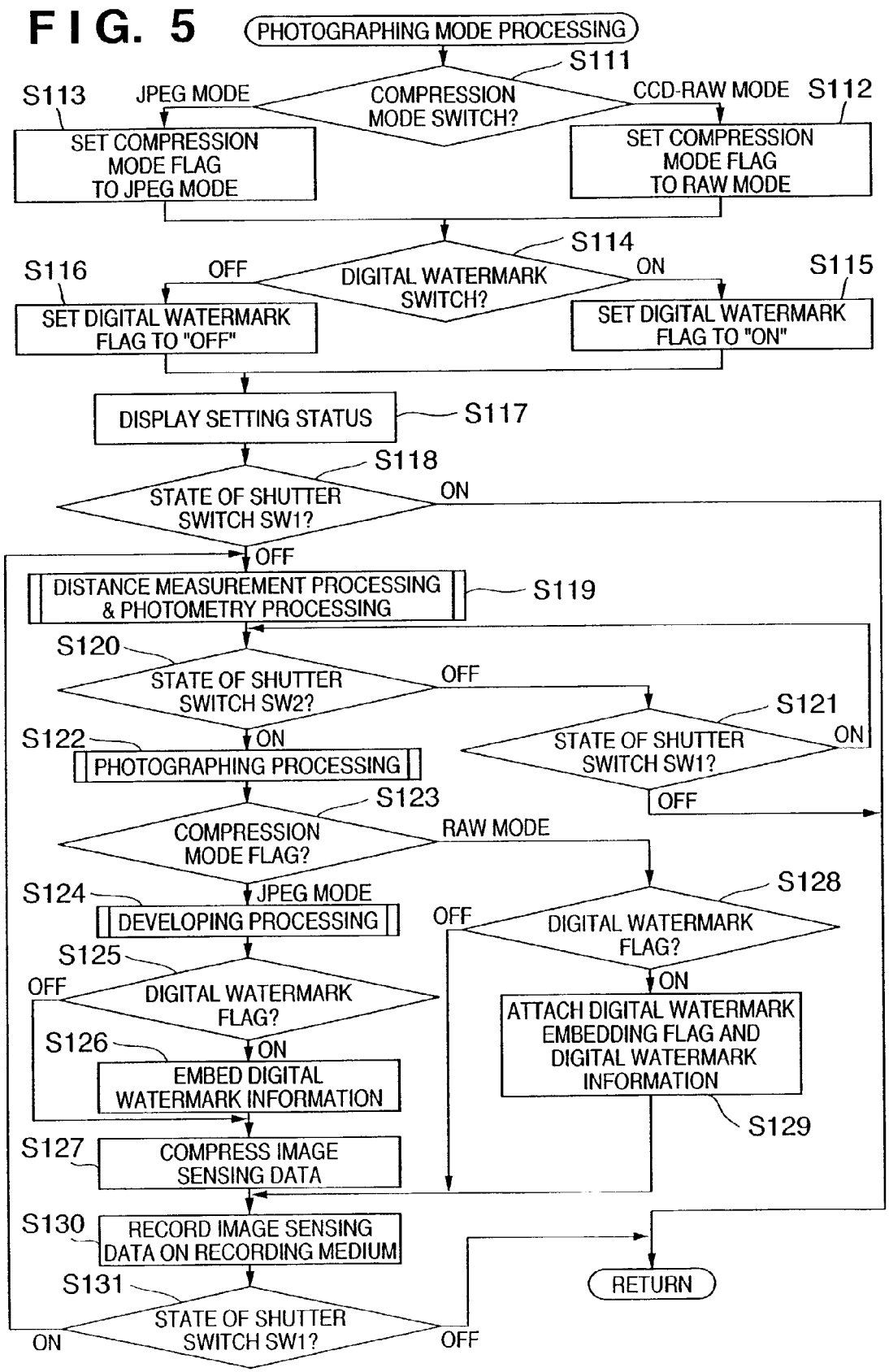
FIG. 5 is a flow chart showing photographing mode processing.

FIG. 5 is a flow chart showing photographing mode processing.

The system control circuit 50 checks the setting state of the compression mode switch 66 (S111). If the compression mode switch 66 is set to the CCD-RAW mode, the system control circuit 50 sets a compression mode flag to the RAW mode (S112); if the compression mode switch 66 is set to the JPEG mode, sets the compression mode flag to the JPEG mode (S113). Note that the compression mode flag is assigned to the internal memory of the system control circuit 50 or the like.

In the CCD-RAW mode, image data which is read out from each line in accordance with the pixel array of the color filter of the image sensing element 14 and written in the work memory 30 via the A/D converter 16 and memory control circuit 22 is read out from the work memory 30 and recorded on the recording medium 200 or 210. In the CCD-RAW mode, an image signal photographed by the image sensing element 14 is directly recorded on the recording medium 200 or 210. The CCD-RAW mode can achieve high-quality recording, but suffers a large image data amount.

In the JPEG mode, image data which is read out from the image sensing element 14 and written in the work memory 30 via the A/D converter 16, image processing circuit 20, and memory control circuit 22 is read out from the work memory 30, compressed by the compression/decompression circuit 32 at a set compression ratio, and recorded on the recording medium 200 or 210. In the JPEG mode, an image signal photographed by the image sensing element 14 is compressed and recorded on the recording medium 200 or 210. The JPEG mode can decrease the image data amount to record a larger number of images. However, the use of the JPEG method as lossy image compression degrades the image quality in accordance with the compression ratio.

Subsequently, the system control circuit 50 checks the setting state of the digital watermark switch 68 (S114). If the digital watermark switch 68 is set to "ON", the system control circuit 50 sets a digital watermark flag to "ON" (S115); if the digital watermark switch 68 is set to "OFF", sets the digital watermark flag to "OFF" (S116). Note that the digital watermark flag is assigned to the internal memory of the system control circuit 50 or the like.

The system control circuit 50 displays various setting states of the electronic camera 100 by an image or sound by using the display section 54 (S117). If the image display of the image display section 28 is "ON", the system control circuit 50 also displays various setting states of the electronic camera 100 by an image or sound by using the image display section 28.

The system control circuit 50 checks the state of the shutter switch SW1 (S118), and if the shutter switch SW1 is OFF (not pressed), returns the processing to the main routine. If the shutter switch SW1 is ON (pressed), the system control circuit 50 performs distance measurement processing to focus the lens 10 to an object to be photographed, and performs photometry processing to determine an aperture value and shutter speed (S119). Details of distance measurement processing and photometry processing will be described later. If necessary, the electronic flash is also set in photometry processing.

The system control circuit 50 checks the state of the shutter switch SW2 (S120). If the shutter switch SW2 is ON (pressed), the system control circuit 50 shifts to photographing processing (S122), and if the shutter switch SW2 is OFF (not pressed), checks the state of the shutter switch SW1 (S121). If the shutter switch SW1 is ON, the system control circuit 50 returns the processing to step S120; if the shutter switch SW1 is OFF, returns the processing to the main routine.

If the shutter switch SW2 is ON, the system control circuit 50 executes photographing processing of writing image sensing data photographed by the image sensing element 14 in a predetermined area of the work memory 30 via the A/D converter 16, image processing circuit 20, and memory control circuit 22 (JPEG mode) or via the A/D converter and memory control circuit 22 (CCD-RAW mode) (S122).

After photographing processing ends, the system control circuit 50 checks the state of the compression mode flag (S123), and branches the processing in accordance with this state.

<JPEG Mode>

The system control circuit 50 performs developing processing including predetermined pixel interpolation processing and color conversion processing for image sensing data read out from the work memory 30 by using the memory control circuit 22 and if necessary, the image processing circuit 20. The system control circuit 50 writes the image sensing data having undergone developing processing in a predetermined area of the work memory 30 (S124).

The system control circuit 50 checks the state of the digital watermark flag (S125). If the digital watermark flag is ON, the system control circuit 50 performs, by using the digital watermark embedding section 34, frequency conversion such as high-speed Fourier transform, discrete cosine transform, or wavelet transform for image sensing data which has undergone developing processing and is read out from a predetermined area of the work memory 30. The system control circuit 50 attaches digital watermark information to the frequency domain, and executes inverse transform to embed the digital watermark information (S126). The image sensing data in which the digital watermark is embedded is stored in a predetermined area of the work memory 30.

The system control circuit 50 JPEG-compresses, by using the compression/decompression circuit 32, image sensing data read out from a predetermined area of the work memory 30 at a compression ratio set in the compression mode switch 66 (S127).

In this manner, the system control circuit 50 can generate JPEG image data in which digital watermark information is embedded in accordance with the state of the digital watermark flag.

<CCD-RAW Mode>

The system control circuit 50 checks the state of the digital watermark flag (S128). If the digital watermark flag is ON, the system control circuit 50 attaches a digital watermark embedding flag and digital watermark information representing information to be embedded as a digital watermark to RAW data which is read out from each line in accordance with the pixel array of the color filter of the image sensing element 14 in photographing processing (S122) and written in a predetermined area of the work memory 30 via the A/D converter 16 and memory control circuit 22 (S129).

RAW data is transferred to the computer 400 via communication and a recording medium, and undergoes predetermined developing processing by the computer 400. Even if, therefore, digital watermark information is embedded in RAW data before developing processing, the subsequent developing processing greatly degrades the embedded digital watermark information. To avoid this, the digital watermark embedding flag which designates embedding of a digital watermark is attached to RAW data, and digital watermark information is embedded after developing processing. Details of digital watermark embedding by the computer 400 will be described later.

In this fashion, the system control circuit 50 generates RAW data to which the digital watermark embedding flag and digital watermark information are attached in accordance with the state of the digital watermark flag. The computer 400 can embed the attached digital watermark information in image sensing data in accordance with the attached digital watermark embedding flag after developing processing of RAW data.

Then, the system control circuit 50 records image sensing data (JPEG data or RAW data) read out from a predetermined area of the work memory 30 on the recording medium 200 or 210 via the I/F 90 and connector 92 or the I/F 94 and connector 96 (S130). The system control circuit 50 checks the state of the shutter switch SW1 (S131), and if the shutter switch SW1 is ON, returns the processing to step S119; if the shutter switch SW1 is OFF, to the main routine.

Distance Measurement Processing and Photometry Processing

Figure 6:
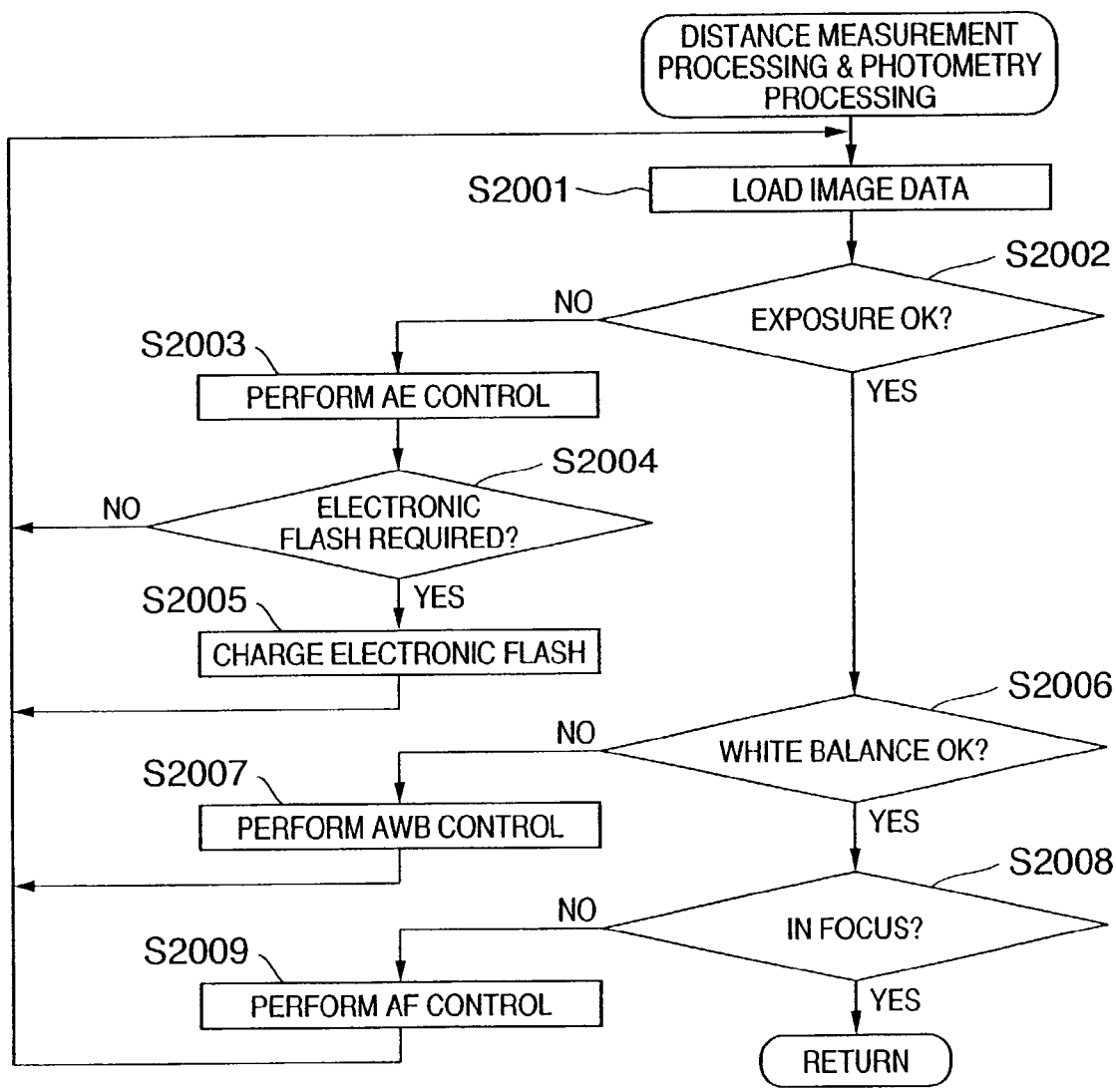
FIG. 6 is a flow chart showing details of distance measurement processing and photometry processing.

FIG. 6 is a flow chart showing details of distance measurement processing and photometry processing.

Image data are sequentially loaded to the image processing circuit 20 via the image sensing element 14 and A/D converter 16 (S2001). The image processing circuit 20 performs arithmetic operations for TTL AE processing, EF processing, AWB processing, and AF processing by using the sequentially loaded image data. These processes are done by extracting a necessary number of regions from the entire photographing region. In each processing, optimal arithmetic operations can be realized in different modes such as a center-weighted mode, average mode, and evaluation mode.

AE control using the exposure controller 40 is performed until exposure is determined in step S2002 to be proper on the basis of the arithmetic result of the image processing circuit 20 (S2003). Whether the electronic flash is required is determined using measurement data obtained by AE control (S2004). If YES in step S2004, the electronic flash flag is set, and the electronic flash 48 is charged (S2005). If YES in step S2002, measurement data and/or setting parameters are stored in the internal memory of the system control circuit 50 or the like.

AWB control of adjusting color processing parameters used by the image processing circuit 20 is performed until the white balance is determined in step S2006 to be proper on the basis of the arithmetic result of the image processing circuit 20 and measurement data obtained by AE control (S2007). If YES in step S2006, measurement data and/or setting parameters are stored in the internal memory of the system control circuit 50 or the like.

AF control using the distance measurement controller 42 is performed until the lens is determined in step S2008 to be in focus by using measurement data obtained by AE control and AWB control (S2009). If YES in step S2008, measurement data and/or setting parameters are stored in the internal memory of the system control circuit 50 or the like. Then, distance measurement processing and photometry processing end.

Photographing Processing

Figure 7:
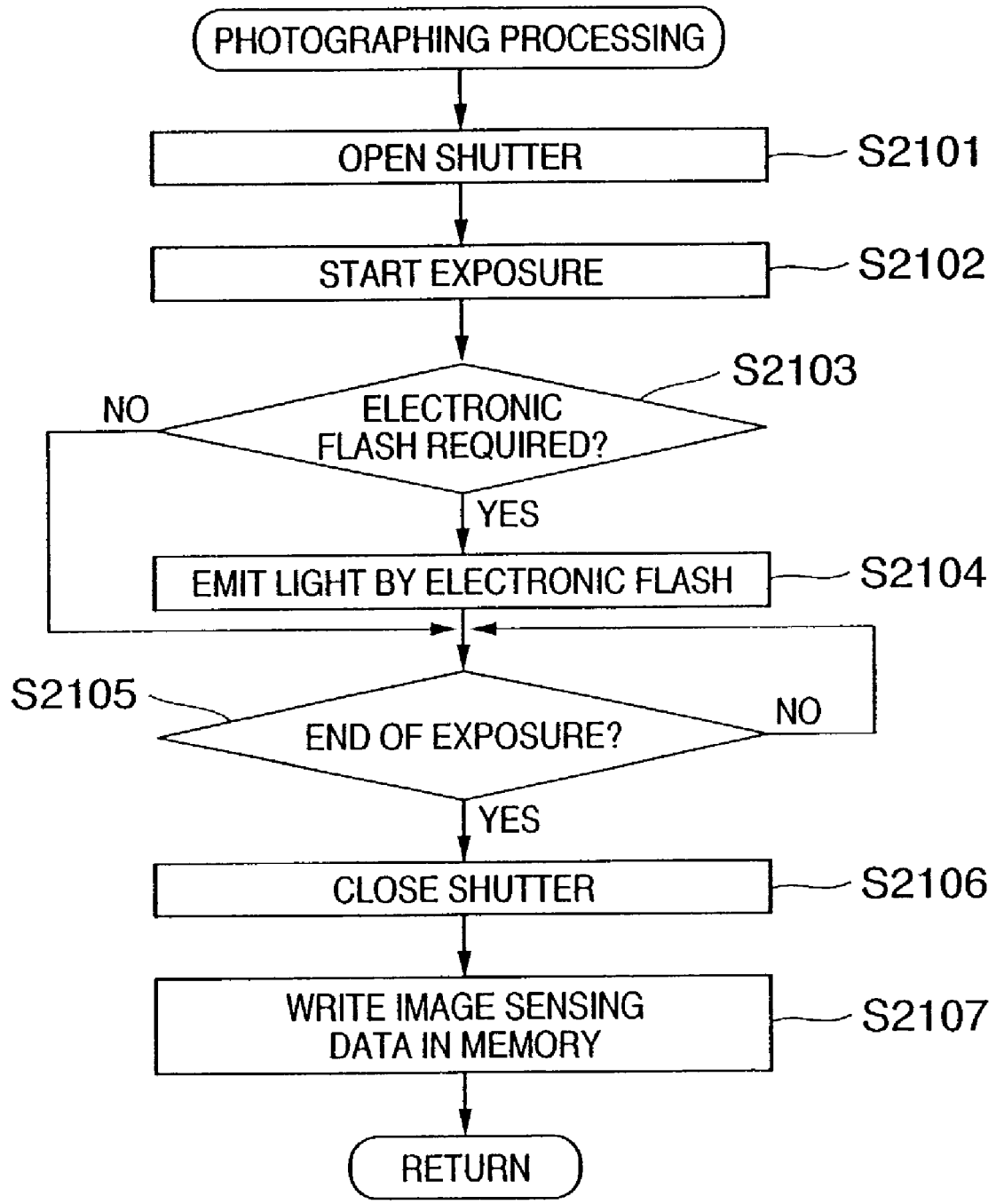
FIG. 7 is a flow chart showing details of photographing processing.

FIG. 7 is a flow chart showing details of photographing processing.

The exposure controller 40 opens the shutter 12 having an aperture function in accordance with the aperture value based on photometry data stored in the internal memory of the system control circuit 50 or the like (S2101), and starts exposure of the image sensing element 14 (S2102). Subsequently, whether the electronic flash is required is determined from the above-described electronic flash flag (S2103), and if YES in step S2103, the electronic flash 48 emits light (S2104).

Based on photometry data, the processing waits until exposure of the image sensing element 14 ends (S2105). After exposure ends, the shutter 12 is closed (S2106), and charge signals are read out from the image sensing element 14. Image sensing data is written in the work memory 30 via the A/D converter 16, image processing circuit 20, and memory control circuit 22 (JPEG mode) or via the A/D converter 16 and memory control circuit 22 (CCD-RAW mode) (S2107), and photographing processing ends.

Communication Processing

Figure 8:
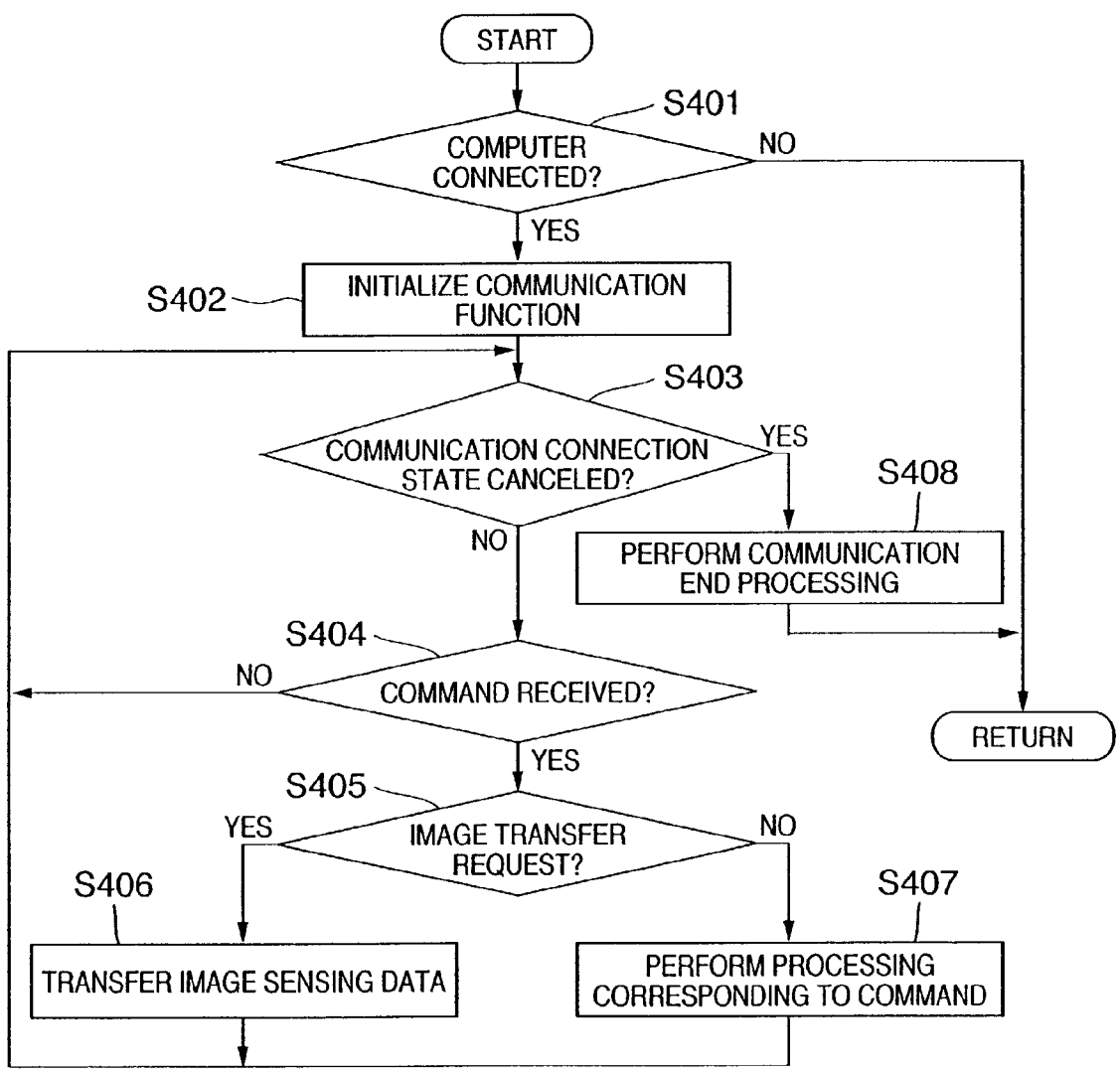
FIG. 8 is a flow chart showing details of communication processing.

FIG. 8 is a flow chart showing details of communication processing.

The system control circuit 50 performs connection detection of detecting, by using the detection function of the communication section 110, whether the electronic camera 100 and computer 400 are connected (S401). If YES in step S401, the system control circuit 50 initializes the communication function including the communication section 110 (S402)

The system control circuit 50 determines, by using the detection function of the communication section 110, whether the communication connection state between the electronic camera 100 and the computer 400 is maintained (S403). If YES in step S403, the system control circuit 50 checks whether the electronic camera 100 has received a command from the computer 400 (S404), and if YES in step S404, checks the contents of the received command (S405). If the received command is a command which requests the electronic camera 100 to transfer an image, the system control circuit 50 transfers image sensing data stored in the recording medium 200 or 210 to the computer 400 in accordance with the request (S406). If the command is another command, the system control circuit 50 executes corresponding processing (S407), and returns the processing to step S403. If no command is received, the system control circuit 50 also returns the processing to step S403.

If NO in step S403, the system control circuit 50 performs predetermined communication end processing concerning the communication function including the communication section 110 (S408), and returns the processing to the main routine.

[Operation of Computer]

Figure 9:
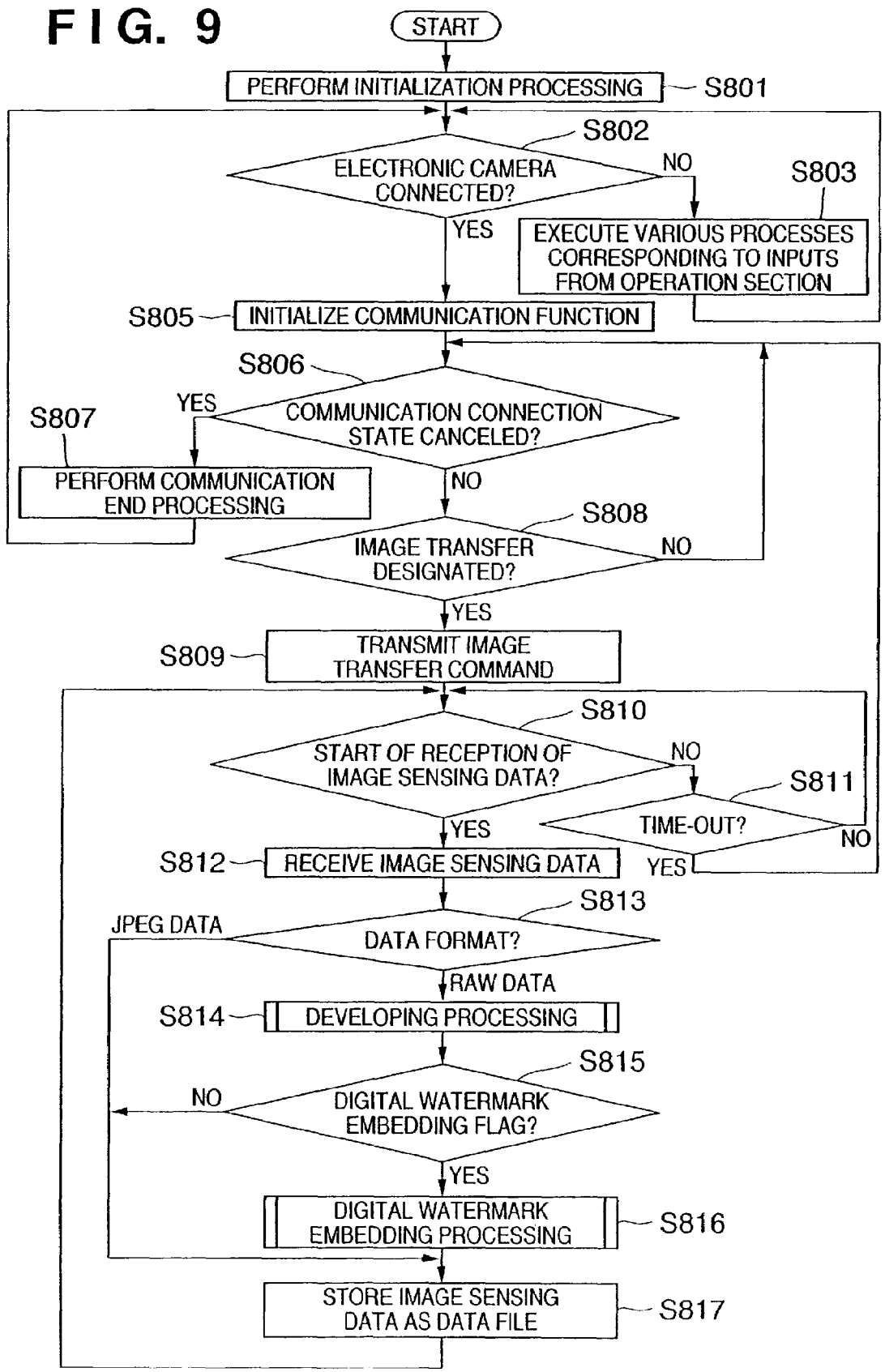
FIG. 9 is a flow chart showing processing when the computer communicates with the electronic camera.

FIG. 9 is a flow chart showing processing when the computer 400 communicates with the electronic camera 100.

When the computer 400 is powered on, initialization processing (S801) is done. That is, the CPU 402 initializes flags, registers, control variables, and the like, and loads a program such as an OS stored in a predetermined area of the HDD 426 to the DRAM 410 via the low-speed bus 424, bus bridge 422, high-speed bus 412, and bus bridge 408. Further, the CPU 402 loads a program in a predetermined amount unit from the DRAM 410 to the cache memory 406 via the bus bridge 408, and executes the program. The CPU 402 initializes the respective sections of the computer 400.

The CPU 402 performs connection detection of detecting, by using the detection function of the network card 414 or communication section 416, whether the computer 400 and electronic camera 100 are connected via the network card 414 or communication section 416 (S802). When the computer 400 and electronic camera 100 are connected via a USB or the like, the CPU 402 performs connection detection via, e.g., a connection cable. When the computer 400 and electronic camera 100 are connected via a LAN, the CPU 402 performs connection detection via the network card 414.

If NO in step S802, the CPU 402 executes various processes corresponding to inputs from the operation section 428 (S803), and returns the processing to step S802.

If YES in step S802, the CPU 402 initializes the communication function including the communication section 416 and communication processing program (S805). When the computer 400 and electronic camera 100 are connected via a USB or the like, the CPU 402 initializes the communication function including, e.g., the computer I/F 430 and communication processing program. When the computer 400 and electronic camera 100 are connected via a LAN, the CPU 402 initializes the communication function including the network card 414 and communication processing program.

Thereafter, the CPU 402 determines whether the communication connection state with the electronic camera 100 is maintained (S806). If YES in step S806, the CPU 402 determines, in accordance with the operation of a communication program including a graphical user interface (GUI), whether the user designates transfer of image sensing data via the operation section 428 (S808). If YES in step S808, the CPU 402 transmits an image transfer command to the electronic camera 100 (S809), and waits for a predetermined time until the CPU 402 receives image sensing data from the electronic camera 100 (S810 and S811). If the CPU 402 does not receive any image sensing data within a predetermined time, the CPU 402 notifies the communication program of time-out, and returns the processing to step S806.

Note that the communication program may automatically generate an image transfer instruction in activation. If NO in step S808, the CPU 402 returns the processing to step S806.

If NO in step S806, the CPU 402 executes predetermined communication end processing concerning the communication function including the communication section 416 and communication processing program (S807), and returns the processing to step S802.

When the computer 400 and electronic camera 100 are connected via a USB or the like, the CPU 402 executes predetermined communication end processing concerning the communication function including, e.g., the computer I/F 430 and communication processing program. When the computer 400 and electronic camera 100 are connected via a LAN, the CPU 402 executes predetermined communication end processing concerning the communication function including the network card 414 and communication processing program. Any one of the computer I/F 430, communication section 416, and network card 414 can be used for communication. In the following description, a repetitive description will be omitted.

After reception of image sensing data from the electronic camera 100 starts, the CPU 402 stores the received image sensing data (including the digital watermark embedding flag and digital watermark information) in a predetermined area of the DRAM 410 via, e.g., the communication section 416, high-speed bus 412, and bus bridge 408 (S812). The CPU 402 determines the data format of the received image sensing data from the header of the data (S813), and if the image sensing data is JPEG data, shifts the processing to step S817.

If the received image sensing data is RAW data, the CPU 402 performs developing processing for the image sensing data read out from the DRAM 410 by using the developing section 436, and stores the image sensing data having undergone developing processing in a predetermined area of the DRAM 410 (S814). By this developing processing, CCD-RAW image sensing data read out from each line in accordance with the pixel array of the color filter of the image sensing element 14 of the electronic camera 100 is converted into a data format displayable on the display section 420.

In place of the developing section 436, a developing processing program stored in the HDD 426 may execute developing processing for CCD-RAW image sensing data by using the cache memory 406 and/or the internal cache memory of the CPU 402, and the image sensing data having undergone developing processing may be stored in a predetermined area of the DRAM 410.

Since the CCD-RAW format is a predetermined unique format, its developing processing requires a dedicated developing processing program. More specifically, CCD-RAW image sensing data undergoes unique lossless compression and unique encryption. This image sensing data cannot be converted into a data format displayable on the display section 420 or the like unless the image processing circuit 20 of the electronic camera 100, the developing section 436 of the computer 400, or the computer 400 uses an executable dedicated developing processing program.

Then, the CPU 402 checks whether the digital watermark embedding flag is attached to the received image sensing data (S815). If YES in step S815, the CPU 402 performs, by using the digital watermark embedding section 434, frequency conversion such as high-speed Fourier transform, discrete cosine transform, or wavelet transform for image sensing data which has undergone developing processing and is read out from the DRAM 410. The CPU 402 reads out digital watermark information stored in the DRAM 410, and attaches the digital watermark information to the frequency domain. The CPU 402 executes inverse transform to embed the digital watermark information, and stores in the DRAM 410 the image sensing data in which the digital watermark information is embedded (S816).

Instead of the digital watermark embedding section 434, a digital watermark embedding program stored in the HDD 426 may embed digital watermark information in image sensing data by using the cache memory 406 and/or the internal cache memory of the CPU 402, and the image sensing data in which the digital watermark information is embedded may be stored in a predetermined area of the DRAM 410.

The CPU 402 reads out image sensing data from the DRAM 410, and writes the data as a data file in the HDD 426 via the bus bridge 408, high-speed bus 412, bus bridge 422, and low-speed bus 424 (S817). Thereafter, the CPU 402 returns the processing to step S810, and waits for reception of the next image sensing data.

Image sensing data written in the HDD 426 is any one of JPEG data in which digital watermark information is embedded by the electronic camera 100, JPEG data in which no digital watermark information is embedded, image sensing data obtained by performing developing processing for RAW data by the computer 400, and image sensing data in which digital watermark information is embedded.

As described above, CCD-RAW image sensing data has a unique data format corresponding to the pixel array of the color filter of the image sensing element 14. When image sensing data is transferred to the computer 400 without embedding any digital watermark information by the electronic camera 100, image data may be copied, tampered, or illicitly used after developing processing of the image sensing data by the computer 400. However, according to this embodiment, CCD-RAW image sensing data to which a flag (and digital watermark information) designating embedding of digital watermark information is attached is transferred to the computer 400, and the computer 400 is caused to successively execute developing processing and digital watermark information embedding processing. This embodiment can, therefore, prevent copying, tampering, and illicit use of image sensing data having undergone developing processing.

Digital watermark information and an embedding designation attached to image sensing data are desirably attached to a specific position of the image sensing data, or encrypted and attached, thereby inhibiting developing processing when the digital watermark information and embedding designation are deleted from the image sensing data or tampered.

Modification

If digital watermark information is always embedded in image sensing data, the digital watermark switch 68 can be omitted from the electronic camera 100. The remaining arrangement is the same as that of the electronic camera 100 of the embodiment. The operation of the electronic camera 100 in this case skips steps S114 to S116, S125, and S128 in the flow chart of FIG. 5.

As far as digital watermark information is always embedded in image sensing data, digital watermark information is automatically embedded in step S126 in image sensing data (JPEG data) photographed in the JPEG mode, or a digital watermark embedding flag and digital watermark information are automatically attached in step S129 to image sensing data (RAW data) photographed in the CCD-RAW mode. The computer 400 which receives RAW data embeds the attached digital watermark information in image sensing data having undergone developing processing.

The above embodiment has exemplified a case in which the present invention is applied to the JPEG and RAW data formats. The present invention can also be applied to a combination of a data format which allows embedding digital watermark information in image sensing data output from the electronic camera 100, and a data format which inhibits embedding digital watermark information or a data format in which digital watermark information is damaged by subsequent processing even if digital watermark information is embedded.

CCD-RAW data has been described as an example of the data format in which digital watermark information is damaged by subsequent processing even if digital watermark information is embedded. However, the data format is not particularly limited as long as the data format is unique to the image sensing element, such as the pixel array of the image sensing element, the color filter layout, or the output order of pixel data. The present invention can be effectively applied to any data format such as a CMOS-RAW format, C-RAW format, or RAW format in the use of a CMOS sensor for the image sensing element.

In the above embodiment, image sensing data is transferred using the communication section 110 of the electronic camera 100 and the communication section 416 of the computer 400. The present invention can also be applied when image sensing data recorded on the recording medium 200 or 210 by the electronic camera 100 is loaded into the computer 400 via a recording medium reader connected to the computer I/F 430 of the computer 400.

The recording media 200 and 210 are not limited to memory cards such as a PCMCIA card and compact flash (CF) card, or hard disks, and may be micro DATS, magnetooptical disks (MOs), or phase change optical disks such as a CD-R, CD-RW, DVD-R, and DVD-R/W. The recording media 200 and 210 may be composite recording media of a memory card and hard disk, or partially detachable composite recording media.

The recording media 200 and 210 are detachable from the electronic camera 100, but either one or both of them may be fixed in the electronic camera 100. Needless to say, one or a plurality of recording media may be connectable to the electronic camera 100.

According to the above-described embodiment, image sensing data photographed in the JPEG photographing recording mode undergoes predetermined developing processing and JPEG compression processing within the electronic camera. A digital watermark is embedded in the image sensing data, and the resultant image sensing data is recorded on a recording medium such as a memory card. Prevention of copying, tampering, and illicit use of photographed/developed image data is guaranteed at the photographing time point.

On the other hand, digital watermark information, or digital watermark information and a digital watermark embedding designation are attached to image sensing data photographed in the RAW photographing recording mode, and the image sensing data is recorded on a recording medium such as a memory card. The digital watermark information attached to the image sensing data is embedded in executing a developing processing program by an information processing apparatus such as a personal computer, or performing developing processing by a device having developing hardware such as an image reproduction device. Prevention of copying, tampering, and illicit use of photographed/developed image data is guaranteed at the developing time point. Although image sensing data can be illicitly copied before developing, the use of the illicitly copied image sensing data before developing is restricted because a digital watermark is embedded by developing processing.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
   an image sensing unit adapted to generate unprocessed image data;
   an image processing unit adapted to process the unprocessed image data so as to generate processed image data;
   an embedding unit adapted to embed first additional information in the processed image data using a digital watermarking technique;
   an attaching unit adapted to attach the first additional information and second additional information to the unprocessed image data, the second additional information indicating to an external device that if the external device generates processed image data from the unprocessed image data, the external device is to embed the first additional information in the processed image data using the digital watermarking technique; and
   a recording unit adapted to (a) record the processed image data, in which the first additional information is embedded, to a removable recording medium, if the camera is in a first image recording mode, and to (b) record the unprocessed image data, to which the first and second additional information are attached, to the removable recording medium, if the camera is in a second image recording mode.

2. The camera according to claim 1, wherein the unprocessed image data has a data format which depends on a pixel away of an image sensing element included in the image sensing unit.

3. The camera according to claim 1, wherein in the unprocessed image data is RAW image data.

4. The camera according to claim 1, further comprising a communication unit adapted to transmit the processed image data, in which the first additional information is embedded, or the unprocessed image data, to which the first and second additional information are attached, in response to a command received from an external device.

5. The camera according to claim 1, wherein the attaching unit encrypts the first additional information before the first additional information is attached to the unprocessed image data.

6. A method of controlling a camera, comprising:
   generating unprocessed image data using an image sensing unit;
   processing the unprocessed image data so as to generate processed image data;

embedding first additional information in the processed image data using a digital watermarking technique;

attaching the first additional information and second additional information to the unprocessed image data, the second additional information indicating to an external device that if the external device generates processed image data from the unprocessed image data, the external device is to embed the first additional information in the processed image data using the digital watermarking technique;

recording the processed image data, in which the first additional information is embedded, to a removable recording medium, if the camera is in a first image recording mode; and recording the unprocessed image data, to which the first and second additional information are attached, to the removable recording medium, if the camera is in a second image recording mode.

7. The method according to claim 6, wherein the unprocessed image data has a data format which depends on a pixel away of an image sensing element included in the image sensing unit.

8. The method according to claim 6, wherein the unprocessed image data is RAW image data.

9. The method according to claim 6, further comprising transmitting the processed image data, in which the first additional information is embedded, or the unprocessed image data, to which the first and second additional information are attached, in response to a command received from an external device.

10. The method according to claim 6, further comprising encrypting the first additional information before the first additional information is attached to the unprocessed image data.

11. A computer readable medium storing a computer program for providing a method of controlling a camera, the method comprising:

generating unprocessed image data using an image sensing unit;

processing the unprocessed image data so as to generate processed image data;

embedding first additional information in the processed image data using a digital watermarking technique;

attaching the first additional information and second additional information to the unprocessed image data, the second additional information indicating to an external device that if the external device generates processed image data from the unprocessed image data, the external device is to embed the first additional information in the processed image data using the digital watermarking technique;

recording the processed image data, in which the first additional information is embedded, to a removable recording medium, if the camera is in a first image recording mode; and recording the unprocessed image data, to which the first and second additional information are attached, to the removable recording medium, if the camera is in a second image recording mode.

12. The computer readable medium according to claim 11, wherein the unprocessed image data has a data format which depends on a pixel away of an image sensing element included in the image sensing unit.

13. The computer readable medium according to claim 11, wherein the unprocessed image data is RAW image data.

14. The computer readable medium according to claim 11, the method further comprising transmitting the processed image data, in which the first additional information is embedded, or the unprocessed image data, to which the first and second additional information are attached, in response to a command received from an external device.

15. The computer readable medium according to claim 11, the method further comprising encrypting the first additional information before the first additional information is attached to the unprocessed image data.

* * * * *

UNITED STATES PATENT AND TRADEMARK OFFICE
CERTIFICATE OF CORRECTION

PATENT NO. : 7,221,391 B2
APPLICATION NO. : 10/206035
DATED : May 22, 2007
INVENTOR(S) : Yamagishi Page 1 of 1

It is certified that error appears in the above-identified patent and that said Letters Patent is hereby corrected as shown below:

COLUMN 9:
Line 47, "connector" should read --connectors--.

COLUMN 12:
Line 46, "sets" should read --the system control circuit 50 sets--.

COLUMN 13:
Line 6, "lossy image" should read --glossy image--.
Line 13, "sets" should read --the system control circuit 50 sets--.
Line 41, "returns" should read --the system control circuit 50 returns--.

COLUMN 14:
Line 58, "returns" should read --the system control circuit 50 returns--.
Line 59, "to the main" should read --the system control circuit 50 return to the main--.

COLUMN 15:
Line 67, "(S402)" should read --(S402).--.

COLUMN 20:
Line 48, "away" should read --array--.
Line 50, "in" should be deleted.

COLUMN 22:
Line 23, "away" should read --array--.

Signed and Sealed this

Thirty-first Day of August, 2010

David J. Kappos
*Director of the United States Patent and Trademark Office*